United States Patent
Moon et al.

(10) Patent No.: US 12,032,832 B2
(45) Date of Patent: Jul. 9, 2024

(54) STORAGE DEVICE AND OPERATING METHOD THEREOF

(71) Applicant: SAMSUNG ELECTRONICS CO., LTD., Suwon-si (KR)

(72) Inventors: Sung Jin Moon, Suwon-si (KR); Chang Hwan Kim, Hwaseong-si (KR); Young-Sik Lee, Suwon-si (KR); Eun Ju Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 17/866,844

(22) Filed: Jul. 18, 2022

(65) Prior Publication Data

US 2023/0195321 A1 Jun. 22, 2023

(30) Foreign Application Priority Data

Dec. 17, 2021 (KR) .................. 10-2021-0181257

(51) Int. Cl.
*G06F 3/06* (2006.01)
(52) U.S. Cl.
CPC .......... *G06F 3/0616* (2013.01); *G06F 3/0631* (2013.01); *G06F 3/0679* (2013.01)
(58) Field of Classification Search
CPC .... G06F 3/0616; G06F 3/0631; G06F 3/0679; G06F 3/061; G06F 3/0617; G06F 11/0727; G06F 11/0778; G06F 3/0659; G06F 11/3089; G06F 11/3034; G06F 2201/84

See application file for complete search history.

(56) References Cited

U.S. PATENT DOCUMENTS

| | | | |
|---|---|---|---|
| 5,968,115 A * | 10/1999 | Trout | G06F 9/4843 718/107 |
| 8,612,982 B2 | 12/2013 | Choi et al. | |
| 8,775,864 B2 | 7/2014 | Brown et al. | |
| 9,424,153 B2 | 8/2016 | Cho et al. | |
| 9,720,797 B2 | 8/2017 | Broderick et al. | |
| 9,875,170 B2 | 1/2018 | Kim | |
| 10,552,264 B2 | 2/2020 | Lemberg et al. | |
| 10,782,345 B2 | 9/2020 | Grosz | |
| 2003/0005417 A1* | 1/2003 | Gard | G06F 11/3656 714/E11.21 |
| 2004/0111654 A1 | 6/2004 | Lin et al. | |
| 2007/0266376 A1* | 11/2007 | Yim | G06F 11/3644 717/129 |

(Continued)

*Primary Examiner* — Tasnima Matin
(74) *Attorney, Agent, or Firm* — Muir Patent Law, PLLC (57) ABSTRACT

A storage device and an operating method thereof are provided. Provided is a storage device including, a memory cell, and a storage controller which includes a flash controller that performs a data operation on the memory cell, and a processor that executes an RTOS (Real Time Operating System) for controlling the flash controller, wherein the RTOS communicates with the storage controller and operates in a normal operation mode, the RTOS generates a snapshot data in a debug mode when a defect occurs, the RTOS switches to the debug mode through context switching in the normal operation mode, and the RTOS operates in the normal operation mode, when an urgent work occurs, while performing an operation of generating the snapshot data in the debug mode.

20 Claims, 8 Drawing Sheets

(56) References Cited

U.S. PATENT DOCUMENTS

| | | | |
|---|---|---|---|
| 2008/0098208 A1* | 4/2008 | Reid | G06F 11/3636 712/234 |
| 2014/0032976 A1* | 1/2014 | Shin | G06F 11/0763 714/47.1 |
| 2014/0075091 A1* | 3/2014 | Bartling | G06F 9/4406 711/102 |
| 2014/0245085 A1* | 8/2014 | Halverson | G06F 11/0766 714/57 |
| 2015/0106660 A1* | 4/2015 | Chumbalkar | G06F 11/3058 711/104 |
| 2018/0129620 A1* | 5/2018 | Gittins | G06F 12/1045 |
| 2018/0173422 A1* | 6/2018 | Pierson | G06F 9/32 |

* cited by examiner

STORAGE DEVICE AND OPERATING METHOD THEREOF

CROSS-REFERENCE TO RELATED APPLICATION

This application claims priority from Korean Patent Application No. 10-2021-0181257 filed on Dec. 17, 2021, in the Korean Intellectual Property Office, and all the benefits accruing therefrom under 35 U.S.C. 119, the contents of which in its entirety are herein incorporated by reference.

BACKGROUND

1. Field

Embodiments relate to a storage device and an operating method thereof.

2. Description of the Related Art

A flash memory device is widely used as audio and video data storage media of information devices, such as a computer, a smartphone, a PDA, a digital camera, a camcorder, a voice recorder, a MP3 player, and a portable computer (Handheld PC). An erasing operation precedes the writing of data on the flash memory, and the unit of data to be deleted may be greater than the unit of data to be written. This may hinder the utilization of a general file system for a hard disk as it is even when the flash memory is used as an auxiliary storage device. Furthermore, sequential I/O processing to the flash memory may be more efficient than non-sequential I/O processing.

SUMMARY

An embodiment is directed to a storage device including, a memory cell, and a storage controller which includes a flash controller that performs a data operation on the memory cell, and a processor that executes an RTOS (Real Time Operating System) for controlling the flash controller, wherein the RTOS communicates with the storage controller and operates in a normal operation mode, the RTOS generates a snapshot data in a debug mode when a defect occurs, the RTOS switches to the debug mode through context switching in the normal operation mode, and the RTOS operates in the normal operation mode, when an urgent work occurs, while performing an operation of generating the snapshot data in the debug mode.

An embodiment is directed to a storage system including, a host, and a storage device that sends and receives data to and from the host, wherein the storage device includes a memory cell, and a storage controller which includes a flash controller that performs a data operation on the memory cell, and a processor that executes an RTOS (Real Time Operating System) for controlling the flash controller, wherein the RTOS communicates with the storage controller and operates in a normal operation mode, the RTOS generates a snapshot data in a debug mode when a defect occurs.

An embodiment is directed to a storage device which includes a processor that executes an RTOS, wherein the RTOS communicates with the storage controller and operates in a normal operation mode, the RTOS generates a snapshot data in a debug mode when a defect occurs.

BRIEF DESCRIPTION OF THE DRAWINGS

Features will become apparent to those of skill in the art by describing in detail example embodiments with reference to the attached drawings in which.

DETAILED DESCRIPTION

Figure 1:
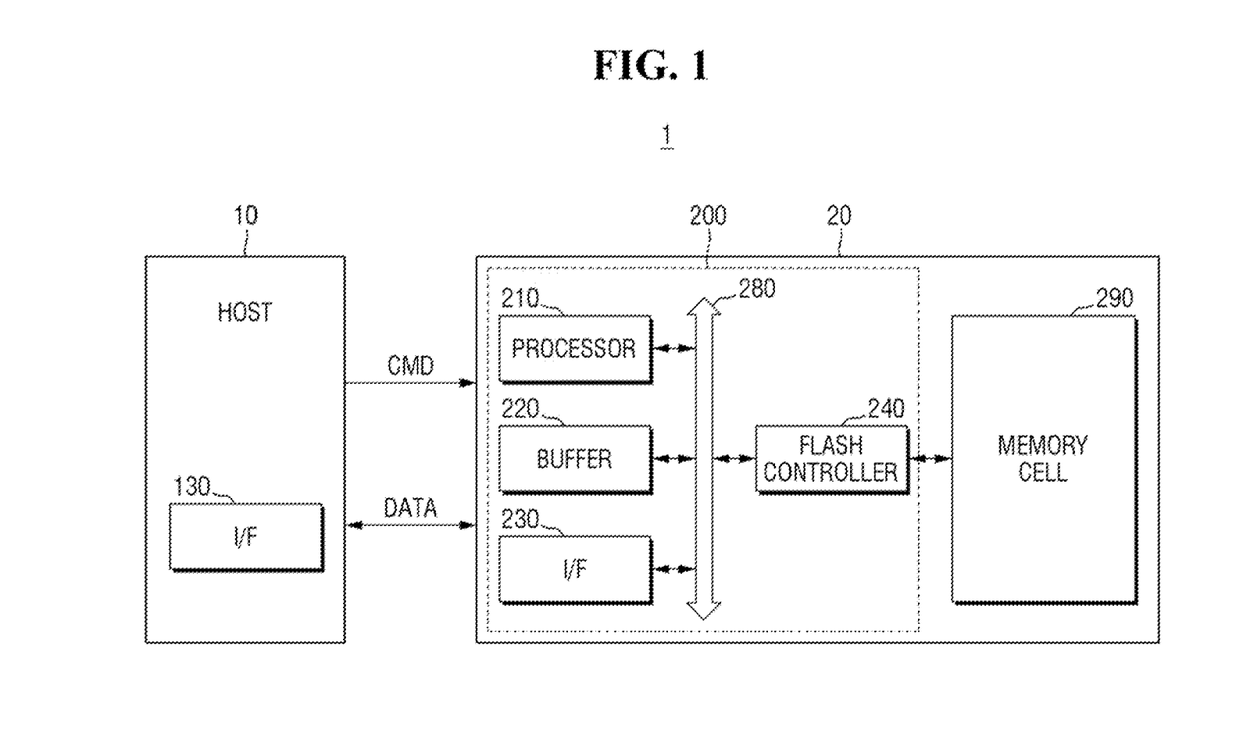
FIG. 1 is a block diagram which shows a storage system according to some example embodiments.

FIG. 1 is a block diagram which shows a storage system according to some example embodiments.

Referring to FIG. 1, a storage system 1 according to an example embodiment may include a host 10 and a storage device 20.

The host 10 may make a request to store data in the storage device 20 or make a request to read data from the storage device 20. For example, the host 10 may transmit a data write command CMD and data DATA to be written to the storage device 20 through a host interface 130. Further, the host 10 may transmit a data read command CMD to the storage device 20 through the host interface 130, and receive the read data DATA from the storage device 20.

The host 10 may send and receive the command CMD and the data DATA to and from the storage device 20 depending on an interface supported by the storage device 20. In some example embodiments, examples of the interface between the host 10 and the storage device 20 may include a UFS (Universal Flash Storage), an SCSI (Small Computer System Interface), an SAS (Serial Attached SCSI), an SATA (Serial Advanced Technology Attachment), a PCIe (Peripheral Constituent element Interconnect Express), an eMMC (embedded MultiMediaCard), a FC (Fibre Channel), an ATA (Advanced Technology Attachment), an IDE (Integrated Drive Electronics), a USB (Universal Serial Bus), an IEEE 1394 (Firewire) and the like. However, embodiments may be applied to any interface that enables data to be sent and received between the host 10 and the storage device 20.

In some example embodiments, the host 10 may be a computing device including, e.g., a personal computer, a server, a notebook computer, a tablet computer, a smart phone, a cellular phone, and the like.

The storage device 20 may include a storage controller 200 and a memory cell 290.

The storage controller 200 may control the overall operations inside the storage device 20. For example, the storage controller 200 may perform data operations for writing, reading, or erasing the data requested by the host 10 on the memory cell 290.

The memory cell 290 may include a non-volatile memory cell. For example, the memory cell 290 may include a memory cell implemented as a flash memory, a Magnetoresistive Random Access Memory (MRAM), a Phase-change Random Access Memory (PRAM), a Ferroelectric Random Access Memory (FeRAM), etc.

The storage controller 200 may include a processor 210, a buffer 220, a storage device interface 230, a flash controller 240, and a bus 280.

The processor 210 may execute and process software for controlling the overall operations inside the storage device 20. The buffer 220 may be used as a main memory for operating the processor 210, or may be used as a cache memory for temporarily storing data etc. In some example embodiments, the buffer 220 may include a volatile memory including a static random access memory (SRAM), a dynamic random access memory (DRAM), etc.

The storage device interface 230 may be electrically connected to the host interface 130 of the host 10 to receive the command CMD and/or data DATA from the host 10, and to provide the data DATA to the host 10. The storage device interface 230 and the host interface 130 may send and receive data through various interfaces as described above.

The flash controller 240 may perform data operations such as write, read, and erase directly on the memory cell 290 under the control of the processor 210.

The processor 210, the buffer 220, the storage device interface 230, and the flash controller 240 may communicate through the bus 280.

In some example embodiments, the storage device 20 may be implemented as a Solid State Drive (SSD) or various flash memory based memory cards.

The host 10 may detect a failure, a defect, or an error of the storage device 20. For example, an error may be detected from the data provided from the storage device 20, or the host 10 may recognize the failure or the error through an error report of the storage device 20. The storage device 20 may detect a failure or an error, and may report the result thereof to the host 10. In another case, the host 10 may provide the storage device 20 with a status confirmation instruction such as an asynchronous event request instruction. The host 10 may determine a problem of the storage device 20 or a communication problem through a failure or error report of the storage device 20 or its own detection.

The host 10 may request the storage device 20 to extract and store dump data or a failure context for preserving the status of the storage device 20 at the time when a failure, defect, or error occurs.

Then, the storage device 20 may extract the status at the time of the failure or error of the firmware, and create corresponding dump data. The created dump data may be used to debug the defect. For example, snapshot data may be generated, using the dump data.

In another case, a failure, a defect, or an error of the storage device 20 may be detected by itself inside the storage device 20. The storage device 20, e.g., the storage controller 200, may provide the dump data or failure context for preserving the status of the storage device 20 at the time of occurrence of the failure, defect, or error.

Then, the storage device 20 may extract the status at the time of the failure or error of firmware, and create corresponding dump data. The created dump data may be used to debug the defect. For example, snapshot data may be generated, using the dump data.

At this time, a Real Time Operating System (RTOS) (e.g., RTOS 24, to be described below in connection with FIG. 2), may enter a debug mode, and may perform the debug operation. More specifically, the RTOS may generate snapshot data, using the dump data described above in the debug mode.

That is, because the RTOS separately operates the debug mode in which the debugging operation is performed, and the normal operation mode in which the same operation as the above-mentioned data operation is performed, the operation efficiency of the storage device 20 can be improved. This will be explained in detail below.

Figure 2:
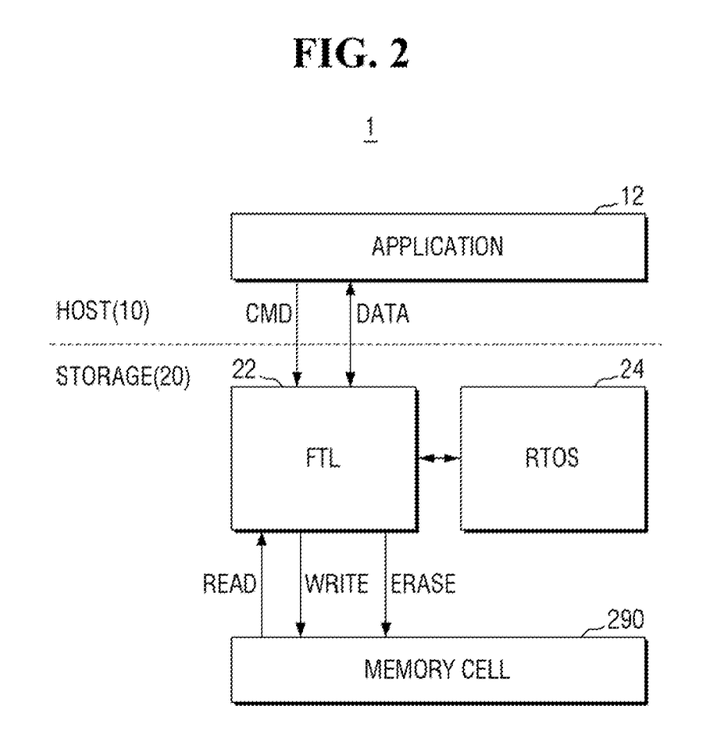
FIG. 2 is a conceptual diagram for explaining the operation of the storage system according to some example embodiments.

FIG. 2 is a conceptual diagram for explaining the operation of the storage system according to some example embodiments.

Referring to FIGS. 1 and 2, in the storage system 1 according to the present example embodiment, an application 12 is executed on the host 10.

The application 12 may receive input from a user, other software, or another device, and may provide the storage device 20 with the command CMD and/or data DATA for causing the storage device 20 to perform the operation.

A Flash Translation Layer (FTL) 22 may perform logical block mapping. For example, the FTL 22 may process the command CMD and the data DATA provided from the host 10, by performing data operations such as read, write, and erase, e.g., on the memory cell 290, using a conversion table that converts a logical block address (LBA) of the host 10 region into a physical block address (PBA) of the memory cell 290. The FTL 22 may perform a garbage collection on the memory cells 290, under the control of the processor 210 of the storage controller 200.

The RTOS 24 is executed by the processor 210 of the storage controller 200. The RTOS 24 may perform scheduling for processing various tasks within a defined time. Also, as described above in FIG. 1, a debugging operation for generating snapshot data may be performed using the dump data.

At this time, the RTOS 24 may use a normal operation mode in which an operation such as scheduling or data operation through communication with the FTL 22 is performed, and a debug mode in which the debugging operation (for example, an operation of generating the snapshot data using the dump data). Accordingly, the storage device 20 according to some example embodiments may enhance the operating efficiency of the storage device 20, by executing an operation other than the debugging operation in the normal operation mode when the debugging operation is performed in the debug mode.

In FIG. 2, although an example of the operation in which the RTOS 24 is performed in the normal operation mode is given by communication with the FTL 22, the operation in the normal operation mode of the storage device 20 may include an operation through the communication with other configurations of the storage controller 200 (e.g., data operation operations performed by controlling the flash controller 240).

Hereinafter, the specific operation of the RTOS 24 will be described as an example.

Figure 3:
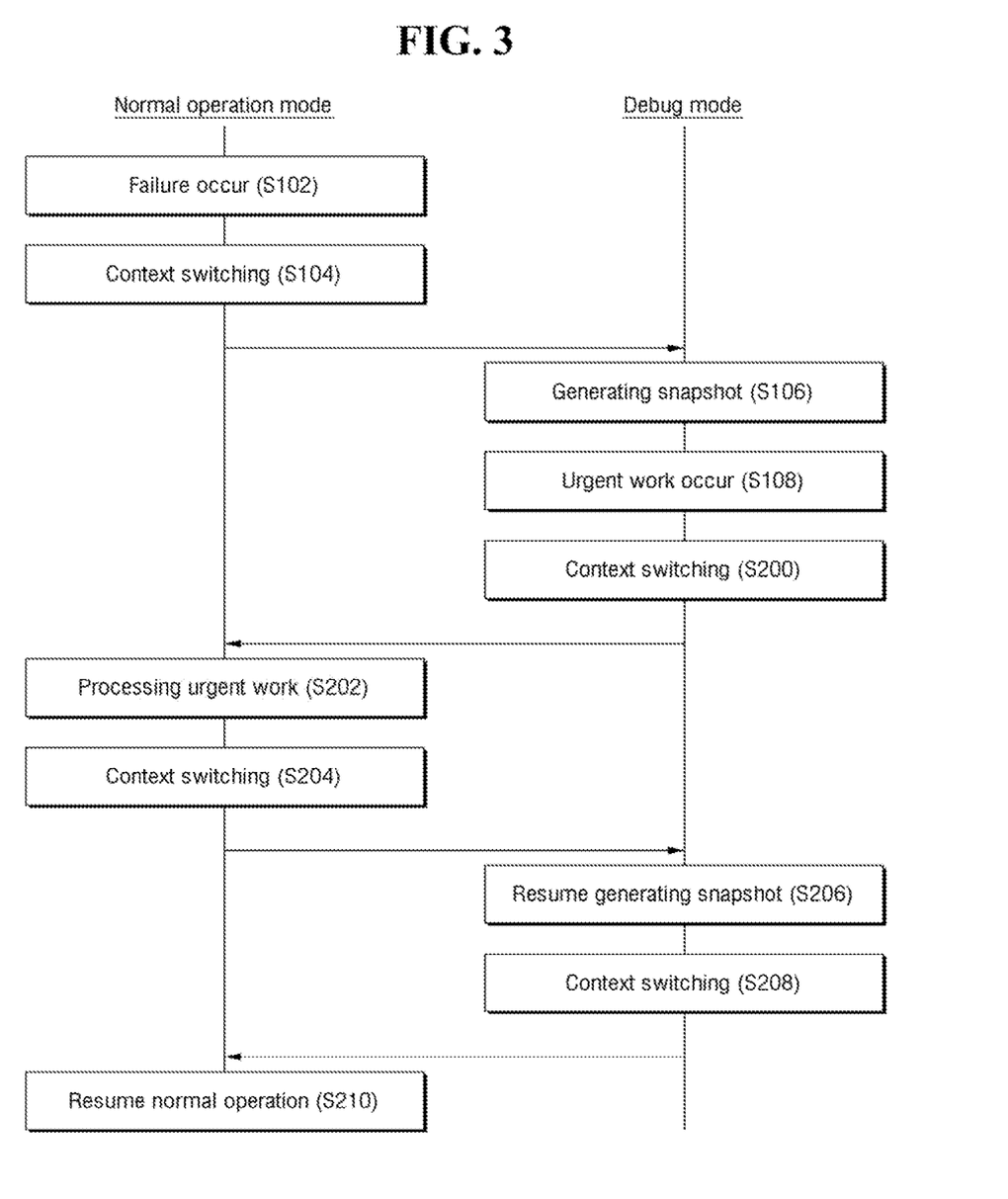
FIG. 3 is a ladder diagram for explaining the operation of the storage device according to some example embodiments.

FIG. 3 is a ladder diagram for explaining the operation of the storage device according to some example embodiments.

Referring to FIGS. 2 and 3, it is assumed that a failure, a defect, or an error occurs while the RTOS 24 is operating in the normal operation mode (S102). Hereinafter, it is generally called a defect. The defect may be, e.g., an error that occurs in the data which the storage device 20 communicates with the host 10.

At this time, the RTOS 24 switches from the normal operation mode to the debug mode through the context switching (S104).

After that, the RTOS 24 executes the debugging operation in the debug mode. More specifically, the RTOS 24 generates snapshot data using the dump data in the debug mode (S106). In this drawing, although the debugging operation in which the RTOS 24 operates in the debug mode is taken as snapshot data generation as an example, the debugging operation in which the RTOS 24 operates in the debug mode is not limited thereto.

After that, it is assumed that an urgent work has occurred while the RTOS 24 generates the snapshot data (S108). In this drawing, it is assumed that an urgent work occurs while the RTOS 24 generates the snapshot data. However, while the RTOS 24 generates the snapshot data, the urgent work does not occur and the snapshot data is completely generated, the operation may return to the normal operation mode again through the context switching.

The urgent work may be, e.g., an occurrence of a work that needs to be performed by the storage system 1 in preference to, e.g., at a higher priority than, the generation operation of the snapshot data, or the urgent work may be an urgent work execution request occurrence from the host 10.

At this time, the RTOS 24 switches to the normal operation mode through the context switching (S200).

The RTOS 24 switched to the normal operation mode performs the urgent work (S202).

After the execution of the urgent work is completed, the RTOS 24 returns to the debug mode again through the context switching (S204).

The RTOS 24 that has returned to the debug mode subsequently performs the snapshot data generation operation again (S206).

After that, when the RTOS 24 completes the snapshot data generation in the debug mode, it switches to the normal operation mode again through the context switching (S208) and performs an operation other than the debugging operation (S210).

Figure 4:
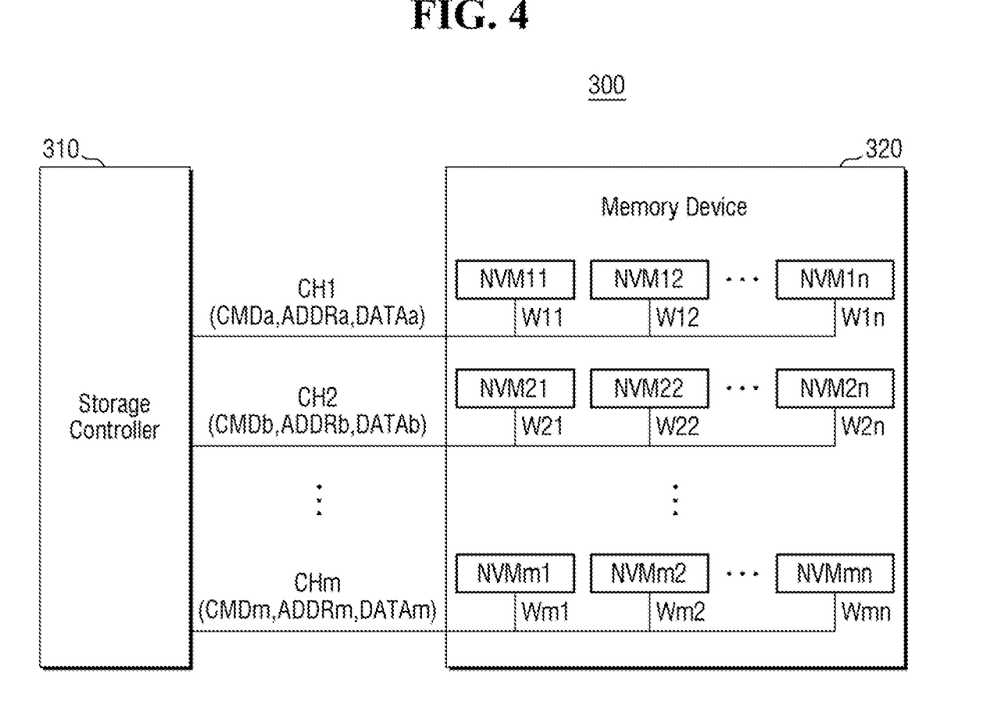
FIG. 4 is a block diagram for explaining a storage system to which the operation of the storage device according to some example embodiments is applied.

FIG. 4 is a block diagram for explaining a storage system to which the operation of the storage device according to some example embodiments is applied.

Referring to FIG. 4, a storage device 300 may include a memory device 320 and a storage controller 310. The storage device 300 may support a plurality of channels CH1 to CHm, and the memory device 320 and the storage controller 310 may be connected through the plurality of channels CH1 to CHm. For example, the storage device 300 may be implemented as a storage device such as a Solid State Drive (SSD).

The memory device 320 may include a plurality of non-volatile memory devices NVM11 to NVMmn. Each of the non-volatile memory devices NVM11 to NVMmn may be connected to one of the plurality of channels CH1 to CHm through corresponding way. For example, non-volatile memory devices NVM11 to NVM1$n$ may be connected to a first channel CH1 through ways W11 to W1$n$, and non-volatile memory devices NVM21 to NVM2$n$ may be connected to a second channel CH2 through ways W21 to W2$n$. In an example embodiment, each of the non-volatile memory devices NVM11 to NVMmn may be implemented in an arbitrary memory unit that may operate according to individual instructions from the storage controller 310. For example, each of the non-volatile memory devices NVM11 to NVMmn may be implemented as a chip or a die.

The storage controller 310 may transmit and receive signals to and from the memory device 320 through the plurality of channels CH1 to CHm. For example, the storage controller 310 may transmit commands CMDa to CMDM, addresses ADDRa to ADDRm, and data DATAa to DATAm to the memory device 320 through the channels CH1 to CHm, or may receive the data DATAa to DATAm from the memory device 320.

The storage controller 310 may select one of the non-volatile memory devices NVM11 to NVMm connected to the channel through each channel, and may transmit and receive signals to and from the selected non-volatile memory device. For example, the storage controller 310 may select the non-volatile memory device NVM11 among the non-volatile memory devices NVM11 to NVM1$n$ connected to a first channel CH1. The storage controller 310 may transmit command CMDa, address ADDRa, and data DATAa to the selected non-volatile memory device NVM11 through the first channel CH1 or may receive the data DATAa from the selected non-volatile memory device NVM11.

The storage controller 310 may transmit and receive signals in parallel to and from the memory device 320 through different channels from each other. For example, the storage controller 310 may transmit a command CMDb to the memory device 320 through a second channel CH2, while transmitting the command CMDa to the memory device 320 through the first channel CH1. For example, the storage controller 310 may receive the data DATAb from the memory device 320 through the second channel CH2, while receiving the data DATAa from the memory device 320 through the first channel CH1.

The storage controller 310 may control the overall operation of the memory device 320. The storage controller 310 may transmit the signal to the channels CH1 to CHm to control each of the non-volatile memory devices NVM11 to NVMmn connected to the channels CH1 to CHm. For example, the storage controller 310 may transmit the command CMDa and the address ADDRa to the first channel CH1 to control selected one among the non-volatile memory devices NVM11 to NVM1$n$.

Each of the non-volatile memory devices NVM11 to NVMmn may operate in accordance with the control of the storage controller 310. For example, the non-volatile memory device NVM11 may program the data DATAa in accordance with the command CMDa and the address ADDRa provided to the first channel CH1. For example, the non-volatile memory device NVM21 may read the data DATAb in accordance with the command CMDb and the address ADDRb provided to the second channel CH2, and transmit the read data DATAb to the storage controller 310.

Although FIG. 4 shows that the memory device 320 communicates with the storage controller 310 through m channels, and the memory device 320 includes n non-volatile memory devices to correspond to each channel, the number of channels and the number of non-volatile memory devices connected to one channel may be variously changed.

Figure 5:
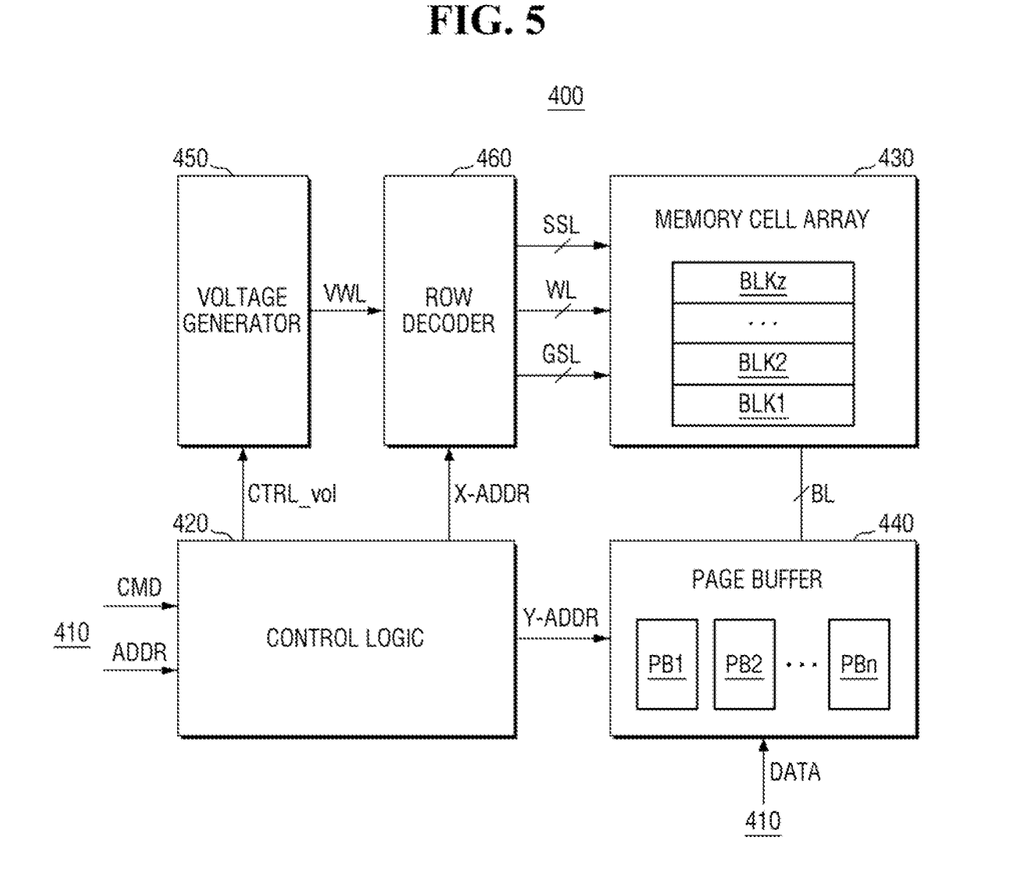
FIGS. 5 and 6 are block diagrams for showing other storage devices to which the operation of the storage device according to some example embodiments is applied.
Figure 6:
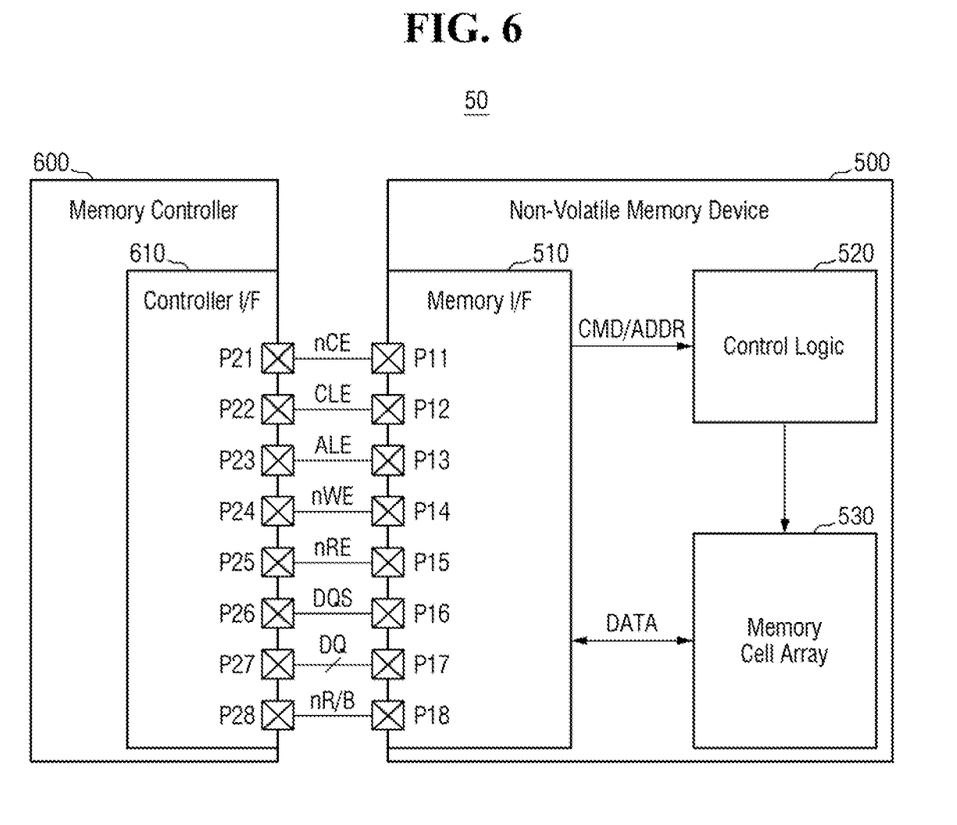

FIGS. 5 and 6 are block diagrams for showing other storage devices to which the operation of the storage device according to some example embodiments is applied.

Referring to FIG. 5 first, a memory device 400 may include a control logic circuit 420, a memory cell array 430, a page buffer 440, a voltage generator 450, and a row decoder 460. Although not shown in FIG. 5, the memory device 400 may include the memory interface circuit 410, a column logic, a pre-decoder, a temperature sensor, a command decoder, an address decoder, and the like.

The control logic circuit 420 may generally control various operations inside the memory device 400. The control logic circuit 420 may output various control signals in response to the command CMD and/or the address ADDR from the memory interface circuit 410. For example, the control logic circuit 420 may output a voltage control signal CTRL_vol, a row address X-ADDR, and a column address Y-ADDR.

The memory cell array 430 may include a plurality of memory blocks BLK1 to BLKz (z is a positive integer), and each of the plurality of memory blocks BLK1 to BLKz may include a plurality of memory cells. The memory cell array 430 may be connected to the page buffer 440 through the bit lines BL, and may be connected to the row decoder 460 through word lines WL, string selection lines SSL, and ground selection lines GSL.

In an example embodiment, the memory cell array 430 may include a three-dimensional memory cell array, and the three-dimensional memory cell array may include a plurality of NAND strings. Each NAND string may include memory cells which are each connected to word lines stacked vertically on the substrate. U.S. Pat. Nos. 7,679,133, 8,553,466, 8,654,587, and U.S. Patent Application Publication No. 2011/0233648 are incorporated herein by reference. In an example embodiment, the memory cell array 430 may include a two-dimensional memory cell array, and the two-dimensional memory cell array may include a plurality of NAND strings placed along row and column directions.

The page buffer 440 may include a plurality of page buffers PB1 to PBn (n is an integer of 3 or more), and each of the plurality of page buffers PB1 to PBn may be connected to the memory cells through a plurality of bit lines BL. The page buffer 440 may select at least one bit line among the bit lines BL in response to the column address Y-ADDR. The page buffer 440 may operate as a write driver or a sense amplifier, depending on the operating mode. For example, at the time of a program operation, the page buffer 440 may apply a bit line voltage corresponding to the data to be programmed to the selected bit line. At the time of a read operation, the page buffer 440 may sense the current or voltage of the selected bit line and sense the data stored in the memory cell.

The voltage generator 450 may generate various types of voltages for performing the program, read, and erase operations on the basis of the voltage control signal CTRL_vol. For example, the voltage generator 450 may generate a program voltage, a read voltage, a program verification voltage, an erase voltage, and the like, as a word line voltage VWL.

The row decoder 460 may select one of a plurality of word lines WL, and may select one of a plurality of string selection lines SSL, in response to the row address X-ADDR. For example, the row decoder 460 may apply the program voltage and the program verification voltage to the selected word line at the time of the program operation, and may apply the read voltage to the selected word line at the time of the read operation.

Referring to FIG. 6, a memory system 50 may include a memory device 500 and a memory controller 600. The memory device 500 may correspond to one of the non-volatile memory devices NVM11 to NVMmn that communicate with the storage controller 200 on the basis of one of the plurality of channels CH1 to CHm of FIG. 4. The memory controller 600 may correspond to the storage controller 200 or the storage controller 310 of FIG. 4.

The memory device 500 may include first to eighth pins P11 to P18, a memory interface circuit 510, a control logic circuit 520, and a memory cell array 530.

The memory interface circuit 510 may receive a chip enable signal nCE from the memory controller 600 through a first pin P11. The memory interface circuit 510 may transmit and receive signals to and from the memory controller 600 through second to eighth pins P12 to P18 in accordance with the chip enable signal nCE. For example, when the chip enable signal nCE is in an enable status (e.g., a low level), the memory interface circuit 510 may transmit and receive signals to and from the memory controller 600 through second to eighth pins P12 to P18.

The memory interface circuit 510 may receive a command latch enable signal CLE, an address latch enable signal ALE, and a write enable signal nWE from the memory controller 600 through second to fourth pins P12 to P14. The memory interface circuit 510 may receive the data signal DQ from the memory controller 600 or transmit the data signal DQ to the memory controller 600 through a seventh pin P17. The command CMD, the address ADDR, and the data DATA may be sent through the data signal DQ. For example, the data signal DQ may be sent through a plurality of data signal lines. In this case, the seventh pin P17 may include a plurality of pins corresponding to the plurality of data signals.

The memory interface circuit 510 may acquire the command CMD from the data signal DQ received in an enable section (e.g., a high level status) of the command latch enable signal CLE on the basis of toggle timings of the write enable signal nWE. The memory interface circuit 510 may acquire the address ADDR from the data signal DQ received in the enable section (e.g., a high level status) of the address latch enable signal ALE on the basis of the toggle timings of the write enable signal nWE.

In an example embodiment, the write enable signal nWE holds a static status (e.g., a high level or a low level) and then may toggle between the high level and the low level. For example, the write enable signal nWE may toggle at the section in which the command CMD or the address ADDR is transmitted. Accordingly, the memory interface circuit 510 may acquire the command CMD or the address ADDR on the basis of the toggle timings of the write enable signal nWE.

The memory interface circuit 510 may receive the read enable signal nRE from the memory controller 600 through a fifth pin P15. The memory interface circuit 510 may receive a data strobe signal DQS from the memory controller 600 through a sixth pin P16, or may transmit the data strobe signal DQS to the memory controller 600.

In a data DATA output operation of the memory device 500, the memory interface circuit 510 may receive the read enable signal nRE that toggles through the fifth pin P15 before output of the data DATA. The memory interface circuit 510 may generate the data strobe signal DQS that toggles on the basis of toggling of the read enable signal nRE. For example, the memory interface circuit 510 may generate the data strobe signal DQS that starts to toggle after a predetermined delay (e.g., tDQSRE) on the basis of a toggling start time of the read enable signal nRE. The memory interface circuit 510 may transmit the data signal DQ including the data DATA on the basis of the toggle timing of the data strobe signal DQS. Accordingly, the data DATA may be arranged at the toggle timing of the data strobe signal DQS and transmitted to the memory controller 600.

In a data DATA input operation of the memory device 500, when the data signal DQ including the data DATA is received from the memory controller 600, the memory interface circuit 510 may receive the data strobe signal DQS that toggles together with the data DATA from the memory controller 600. The memory interface circuit 510 may acquire the data DATA from the data signal DQ on the basis of the toggle timing of the data strobe signal DQS. For example, the memory interface circuit 510 may acquire the data DATA by sampling the data signal DQ at a rising edge and a falling edge of the data strobe signal DQS.

The memory interface circuit 510 may transmit a ready/busy output signal nR/B to the memory controller 600 through an eighth pin P18. The memory interface circuit 510 may transmit the status information of the memory device 500 to the memory controller 600 through the ready/busy output signal nR/B. When the memory device 500 is in a busy status (that is, when the internal operations of the memory device 500 are being performed), the memory interface circuit 510 may transmit the ready/busy output signal nR/B indicating the busy status to the memory controller 600. When the memory device 500 is in a ready status (i.e., the internal operations of the memory device 500 are not performed or are completed), the memory interface circuit 510 may transmit the ready/busy output signal nR/B indicating the ready status to the memory controller 600. For example, while the memory device 500 reads the data DATA from the memory cell array 530 in response to a page read command, the memory interface circuit 510 may transmit the ready/busy output signal nR/B indicating the busy status (e.g., a low level) to the memory controller 600. For example, while the memory device 500 programs the data DATA to the memory cell array 530 in response to the program command, the memory interface circuit 510 may transmit the ready/busy output signal nR/B indicating the busy status to the memory controller 600.

The control logic circuit 520 may generally control various operations of the memory device 500. The control logic circuit 520 may receive the command/address CMD/ADDR acquired from the memory interface circuit 510. The control logic circuit 520 may generate control signals for controlling other constituent elements of the memory device 500 in accordance with the received command/address CMD/ADDR. For example, the control logic circuit 520 may generate various control signals for programing the data DATA in the memory cell array 530 or reading the data DATA from the memory cell array 530.

The memory cell array 530 may store the data DATA acquired from the memory interface circuit 510 under the control of the control logic circuit 520. The memory cell array 530 may output the stored data DATA to the memory interface circuit 510 under the control of the control logic circuit 520.

The memory cell array 530 may include a plurality of memory cells. For example, the plurality of memory cells may be flash memory cells. However, the memory cells may be Resistive Random Access Memory (RRAM) cells, Ferroelectric Random Access Memory (FRAM) cells, Phase Change Random Access Memory (PRAM) cells, Thyristor Random Access Memory (TRAM) cells, or Magnetic Random Access Memory (MRAM) cells. Hereinafter, example embodiments will be described mainly on the basis of an example embodiment in which the memory cells are NAND flash memory cells.

The memory controller 600 may include first to eighth pins P21 to P28, and a controller interface circuit 610. The first to eighth pins P21 to P28 may correspond to the first to eighth pins P11 to P18 of the memory device 500.

The controller interface circuit 610 may transmit the chip enable signal nCE to the memory device 500 through a first pin P21. The controller interface circuit 610 may transmit and receive signals to and from the memory device 500 selected through the chip enable signal nCE, through the second to eighth pins P22 to P28.

The controller interface circuit 610 may transmit the command latch enable signal CLE, the address latch enable signal ALE, and the write enable signal nWE to the memory device 500 through the second to fourth pins P22 to P24. The controller interface circuit 610 may transmit the data signal DQ to the memory device 500 or receive the data signal DQ from the memory device 500 through a seventh pin P27.

The controller interface circuit 610 may transmit the data signal DQ including the command CMD or the address ADDR to the memory device 500 along with the toggling write enable signal nWE. The controller interface circuit 610 may transmit the data signal DQ including the command CMD to the memory device 500 by transmitting the command latch enable signal CLE having the enable status, and may transmit the data signal DQ including the address ADDR to the memory device 500 by transmitting the address latch enable signal ALE having the enable status.

The controller interface circuit 610 may transmit the read enable signal nRE to the memory device 500 through a fifth pin P25. The controller interface circuit 610 may receive the data strobe signal DQS from the memory device 500 through a sixth pin P26, or may transmit the data strobe signal DQS to the memory device 500.

In the data DATA output operation of the memory device 500, the controller interface circuit 610 may generate a toggling read enable signal nRE and transmit the read enable signal nRE to the memory device 500. For example, the controller interface circuit 610 may generate the read enable signal nRE that changes from the static status (e.g., a high level or a low level) to the toggle status before the data DATA is output. Accordingly, the data strobe signal DQS which toggles on the basis of the read enable signal nRE may be generated in the memory device 500. The controller interface circuit 610 may receive the data signal DQ including the data DATA along with the toggling data strobe signal DQS from the memory device 500. The controller interface circuit 610 may acquire the data DATA from the data signal DQ on the basis of the toggle timing of the data strobe signal DQS.

In the data DATA input operation of the memory device 500, the controller interface circuit 610 may generate the toggling data strobe signal DQS. For example, the controller interface circuit 610 may generate a data strobe signal DQS that changes from the static status (e.g., a high level or a low level) to the toggle status before transmitting the data DATA. The controller interface circuit 610 may transmit the data signal DQ including the data DATA to the memory device 500 on the basis of the toggle timings of the data strobe signal DQS.

The controller interface circuit 610 may receive a ready/busy output signal nR/B from the memory device 500 through an eighth pin P28. The controller interface circuit 610 may discriminate the status information of the memory device 500 on the basis of the ready/busy output signal nR/B.

Figure 7:
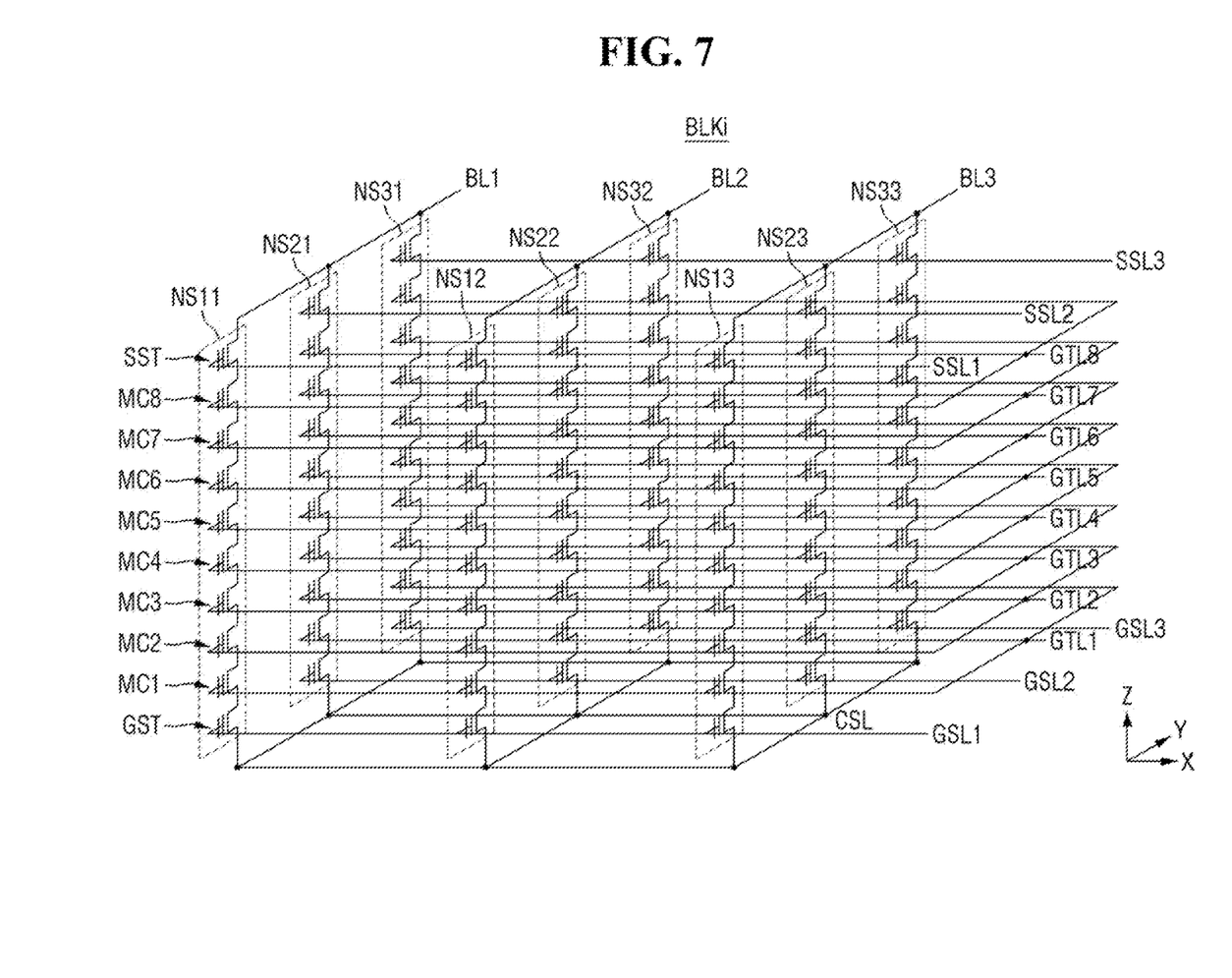
FIG. 7 is a diagram for explaining a 3D-VNAND structure which may be applied to the storage device according to some example embodiments.

FIG. 7 is a diagram for explaining a 3D-VNAND structure which may be applied to the storage device according to some example embodiments. When the storage module of the UFS device is embodied as a 3D V-NAND type flash memory, each of the plurality of memory blocks constituting the storage module may be represented by an equivalent circuit as shown in FIG. 7.

A memory block BLKi shown in FIG. 7 shows a three-dimensional memory block formed in a three-dimensional structure on the substrate. For example, a plurality of memory NAND strings included in the memory block BLKi may be formed in a direction perpendicular to the substrate.

Referring to FIG. 7, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. Although FIG. 8 shows that each of the plurality of memory NAND strings NS11 to NS33 includes eight memory cells MC1, MC2, . . . , MC8, the number of memory cells may be varied.

The string selection transistor SST may be connected to corresponding string selection lines SSL1, SSL2, and SSL3. Each of the plurality of memory cells MC1, MC2, . . . , MC8 may be connected to corresponding gate lines GTL1, GTL2, . . . , GTL8. The gate lines GTL1, GTL2, . . . , GTL8 may correspond to word lines, and some of the gate lines GTL1, GTL2, . . . , GTL8 may correspond to dummy word lines. The ground selection transistor GST may be connected to corresponding ground selection lines GSL1, GSL2, and GSL3. The string selection transistor SST may be connected to the corresponding bit lines BL1, BL2, and BL3, and the ground selection transistor GST may be connected to the common source line CSL.

Word lines (e.g., WL1) of the same height are connected in common, and the ground selection lines GSL1, GSL2, and GSL3 and the string selection lines SSL1, SSL2, and SSL3 may be separated, respectively. Although FIG. 8 shows that the memory block BLK is connected to eight gate lines GTL1, GTL2, . . . , GTL8 and three bit lines BL1, BL2, and BL3, the respective numbers thereof may be varied.

Figure 8:
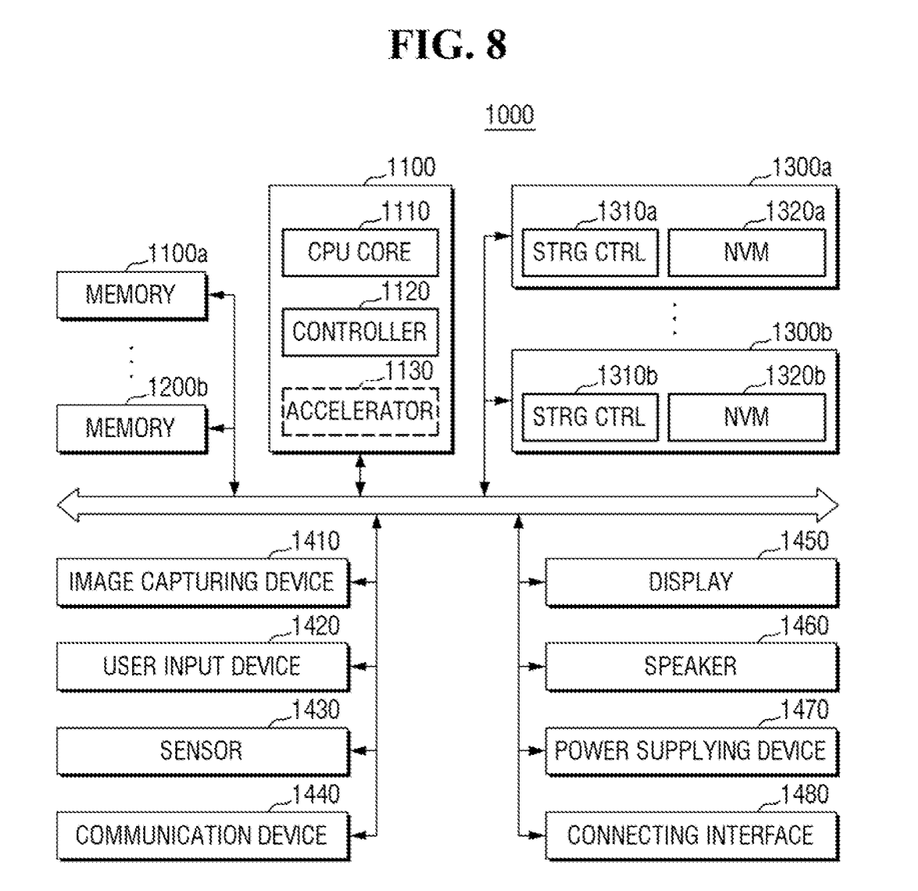
FIG. 8 is an example block diagram for explaining a system to which the operation of the storage device according to some example embodiments is applied.

FIG. 8 is an example block diagram for explaining a system to which the operation of the storage device according to some example embodiments is applied.

Referring to FIG. 8, a system 1000 may be a mobile system, such as a mobile phone, a smart phone, a tablet personal computer (tablet PC), a wearable device, a healthcare device, or an internet of things (IOT) device. However, the system 1000 of FIG. 8 may also be a personal computer, a laptop computer, a server, a media player, or an automotive device such as navigation.

Referring to FIG. 8, the system 1000 may include a main processor 1100, memories 1200a and 1200b, storage devices 1300a, 1300b, an image capturing device 1410, a user input device 1420, a sensor 1430, a communication device 1440, a display 1450, a speaker 1460, a power supplying device 1470, and a connecting interface 1480.

The main processor 1100 may control the overall operations of the system 1000, e.g., the operations of other constituent elements that make up the system 1000. The main processor 1100 may be implemented as a general-purpose processor, a dedicated processor, an application processor, etc.

The main processor 1100 may include one or more CPU cores 1110, and a controller 1120 for controlling the memories 1200a and 1200b and/or the storage devices 1300a and 1300b. The main processor 1100 may include an accelerator 1130, which is a dedicated circuit for a high-speed data computation such as an artificial intelligence (AI) data computation. Such an accelerator 1130 may include a Graphics Processing Unit (GPU), a Neural Processing Unit (NPU) and/or a Data Processing Unit (DPU), and the like, and may be implemented as separate chips that are physically independent of other constituent elements of the main processor 1100.

The memories 1200a and 1200b may be used as a main memory unit of the system 1000, and may include a volatile memory such as an SRAM and/or a DRAM, and/or a non-volatile memory such as a flash memory, a PRAM and/or a RRAM. The memories 1200a and 1200b may also be implemented inside the same package as the main processor 1100.

The storage devices 1300a and 1300b may function as non-volatile storage devices that store data regardless of whether a power is supplied, and may have a relatively larger storage capacity than the memories 1200a and 1200b. The storage devices 1300a and 1300b may include storage controllers 1310a and 1310b, and non-volatile memories (NVM) 1320a and 1320b that store data under the control of the storage controllers 1310a and 1310b. The non-volatile memories 1320a and 1320b may include a flash memory of a 2-dimensional (2D) structure or a 3-dimensional (3D) Vertical NAND (V-NAND) structure, and/or other types of non-volatile memories such as a PRAM and/or a RRAM.

The storage devices 1300a and 1300b may be included in the system 1000 in a state of being physically separated from the main processor 1100, and may be implemented in the same package as the main processor 1100. The storage devices 1300a and 1300b may have a shape such as a solid state drive (SSD) or a memory card, and the storage devices 1300a and 1300b may also be detachably coupled with other constituent elements of the system 1000 through an interface such as a connecting interface 1480 to be described below. Such storage devices 1300a and 1300b may be devices to which standard protocols such as a universal flash storage (UFS), an embedded multi-media card (eMMC), or a non-volatile memory express (NVMe) are applied.

The image capturing device 1410 may capture still images or moving images, and may be a camera, a camcorder, a webcam, etc.

The user input device 1420 may receive various types of data that are input from users of the system 1000, and may be a touch pad, a keypad, a keyboard, a mouse and/or a microphone.

The sensor 1430 may detect various types of physical quantities that may be acquired from the outside of the system 1000, and convert the detected physical quantities into electrical signals. The sensor 1430 may be a temperature sensor, a pressure sensor, an illuminance sensor, a position sensor, an acceleration sensor, a biosensor and/or a gyroscope sensor.

The communication device 1440 may transmit and receive signals to and from other devices outside the system 1000 according to various communication protocols. The communication device 1440 may be implemented to include an antenna, a transceiver, a modem, etc.

The display 1450 and the speaker 1460 may each function as output devices that output visual and auditory information to the user of the system 1000.

The power supplying device 1470 may convert the power supplied from a battery (not shown) equipped in the system 1000 and/or an external power supply, and supply the power to each constituent element of the system 1000.

The connecting interface 1480 may provide a connection between the system 1000 and an external device that may be connected to the system 1000 to transmit and receive data to and from the system 1000. The connecting interface 1480 may be implemented in various interface types, such as an Advanced Technology Attachment (ATA), a Serial ATA (SATA), an external SATA (e-SATA), a Small Computer System Interface (SCSI), a Serial Attached SCSI (SAS), a Peripheral Component Interconnection (PCI), a (PCI express (PCIe), a NVMe, an IEEE 1394, a Universal Serial Bus (USB), an Secure Digital (SD) card, a Multi-Media Card (MMC), an eMMC, a UFS, an embedded Universal Flash Storage (eUFS), and a Compact Flash (CF) card interface.

By way of summation and review, an example of a large-capacity storage device based on a flash memory is a solid state drive (SSD). With the explosive increase in demand for the solid state drive (SSD), the applications thereof are variously divided. For example, the applications may be subdivided into an SSD for server, an SSD for client, an SSD for data center, and the like. The solid state drive (SSD) used in such applications may be managed and maintained to provide high reliability and optimal quality of service. However, unexpected failures or errors due to hardware or software problems may occur during operation of the solid state drive (SSD). In this case, the solid state drive (SSD) may collect a device state at the time of occurrence of error or failure, and store it as dump data. The collected dump data may be transferred to a host to which the solid state drive (SSD) is connected. The dump data transferred to the host may be provided to a debugging tool or a debugging apparatus, and dump data-based debugging is performed. At this time, it is important to provide for operation of the storage device (for example, the above-mentioned solid state drive) other than the debugging, while the debugging is being performed.

As described above, embodiments may provide a storage device that may perform an operation other than the debugging operation even during the debugging operation in the debugging operation mode, through a Real Time Operating System (RTOS) which operates separately the debugging operation mode and a normal operation mode.

Embodiments may also provide an operating method of the storage device that may perform an operation other than the debugging operation even during the debugging operation in the debugging operation mode, through a RTOS which operates separately the debugging operation mode and a normal operation mode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a memory cell; and
a storage controller which includes a flash controller that performs a data operation on the memory cell, and a processor that executes a Real Time Operating System (RTOS) for controlling the flash controller, wherein:
the RTOS communicates with the storage controller and operates in a normal operation mode,
the storage device is configured to detect a defect by itself inside the storage device,
the RTOS generates a snapshot data in a debug mode when the storage device is detected the defect,
the RTOS switches to the debug mode through context switching in the normal operation mode, and
the RTOS operates in the normal operation mode, when an urgent work occurs, while performing an operation of generating the snapshot data in the debug mode.

2. The storage device as claimed in claim 1, wherein the data operation includes an operation in which a flash controller writes data on the memory cell.

3. The storage device as claimed in claim 1, wherein the RTOS switches to the normal operation mode through context switching in the debug mode.

4. The storage device as claimed in claim 1, wherein the defect includes a case in which an error occurs in data transmitted and received by the flash controller to and from the memory cell.

5. The storage device as claimed in claim 1, wherein the snapshot data is generated on the basis of a dump data in which the defect occurs.

6. The storage device as claimed in claim 1, wherein the data operation includes an operation in which the flash controller reads data stored in the memory cell.

7. The storage device as claimed in claim 1, wherein the urgent work is a work that has a higher priority than an operation of generating the snapshot data.

8. The storage device as claimed in claim 1, wherein, when the urgent work is completed in the normal operation mode, the RTOS operates in the debug mode and subsequently performs an operation of generating the snapshot data.

9. The storage device as claimed in claim 1, when an operation of generating the snapshot data is completed in the debug mode, the RTOS switches to the normal operation mode through context switching.

10. A storage system, comprising:
a host; and
a storage device that sends and receives data to and from the host, the storage device including:
a memory cell, and
a storage controller which includes a flash controller that performs a data operation on the memory cell, and a processor that executes a Real Time Operating System (RTOS) for controlling the flash controller, wherein:
the RTOS communicates with the storage controller and operates in a normal operation mode,
the storage device is configured to detect a defect by itself inside the storage device, and
the RTOS generates a snapshot data in a debug mode when the storage device is detected the defect.

11. The storage system as claimed in claim 10, wherein the RTOS switches to the debug mode through context switching in the normal operation mode.

12. The storage system as claimed in claim 10, wherein the RTOS switches to the normal operation mode through context switching in the debug mode.

13. The storage system as claimed in claim 10, wherein the defect includes a case in which an error occurs in data transmitted and received by the flash controller to and from the memory cell.

14. The storage system as claimed in claim 10, wherein the snapshot data is generated on the basis of a dump data in which the defect occurs.

15. The storage system as claimed in claim 10, wherein the RTOS operates in the normal operation mode, when an urgent work occurs, while performing an operation of generating the snapshot data in the debug mode.

16. The storage system as claimed in claim 15, wherein the urgent work is a work that has a higher priority than the operation of generating the snapshot data.

17. The storage system as claimed in claim 15, wherein, when the urgent work is completed in the normal operation mode, the RTOS operates in the debug mode and subsequently performs an operation of generating the snapshot data.

18. The storage system as claimed in claim 10, when an operation of generating the snapshot data is completed in the debug mode, the RTOS switches to the normal operation mode through context switching.

19. A storage device, comprising:
a storage controller; and
a processor configured to execute a Real Time Operating System (RTOS), wherein:
the RTOS communicates with the storage controller and operates in a normal operation mode,
the storage device is configured to detect a defect by itself inside the storage device, and
the RTOS generates a snapshot data in a debug mode when the storage device is detected the defect.

20. The storage device as claimed in claim 19, wherein the RTOS switches between the normal operation mode and the debug mode through context switching.

* * * * *